3,368,003
3-TRIFLUOROMETHYL PHENYL PHOSPHORAMIDOTHIOATES

Etcyl H. Blair and Kenneth C. Kauer, Midland, Mich., assignors to The Dow Chemical Company, Midland, Mich., a corporation of Delaware
No Drawing. Filed Aug. 16, 1965, Ser. No. 480,179
3 Claims. (Cl. 260—955)

When the present invention is directed to phenyl phosphorothioate compound of the formula:

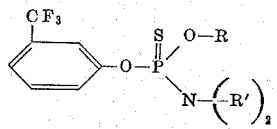

In this and succeeding formulae in the present specification and claims, R represents loweralkyl and each R' independently represents hydrogen or loweralkyl. The expression "loweralkyl" is employed in the present specification and claims to designate an alkyl radical being of from 1 to 4, both inclusive, carbon atoms.

The products of the present invention are liquid or crystalline solid materials which are somewhat soluble in many common organic solvents and of very low solubility in water. They are prepared by either of two methods. The preferred method comprises reacting a phosphorochloridothioate of the formula:

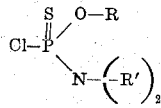

with a phenol reactant of the formula:

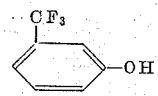

in the presence of a hydrogen chloride acceptor, preferably an organic tertiary amine.

The reaction conveniently is carried out in the presence of an inert liquid reaction medium, preferably an organic liquid. Representative suitable organic liquids include the hydrocarbons, such as hexane, cyclohexane, benzene, and toluene; and chlorinated hydrocarbons, such as chloroform, chlorobenzene, and carbon tetrachloride; and ketones, such as isobutyl methyl ketone. The amounts of phosphorochloridothioate, phenol reactant, and hydrogen chloride acceptor which are employed are not critical, some of the desired product of the present invention being obtained when employing any amounts. However, higher yields of product are obtained when employing essentially equimolecular proportions of phosphorochloridothioate, phenol reactant and hydrogen chloride acceptor.

The reaction goes forward smoothly in the temperature range of from 0° to 100° C., with the production of the desired product and hydrogen chloride by-product, which by-product appears in the reaction mixture—in the instance wherein an organic tertiary amine is employed as hydrogen chloride acceptor—as the hydrochloride salt of the amine. However, the reaction is typically run under reflux, and therefore, the temperature at which the reaction is conducted is dependent upon the identity of the organic liquid serving as inert liquid reaction medium.

In carrying out the reaction, the phosphorochloridothioate, phenol reactant, and hydrogen chloride acceptor are mixed and contacted together in any convenient fashion, and the resulting mixture maintained for a period of time in the reaction temperature range. The reaction mixture thus obtained contains the product of the present invention, and when desired, can be employed for the useful purpose of the present invention. However, in many instances, it is preferred that the product be separated from the reaction mixture. Such separation is carried out in conventional procedures. Typically, the reaction mixture is washed with water to separate the by-product hydrochloride salt of the amine, and the organic liquid employed as reaction medium removed from the washed mixture by evaporation under subatmospheric pressure to obtain the product as a residue. When desired, this product residue can be purified by such procedures as recrystallization and washing with appropriate solvent.

In an alternative procedure, the products of the present invention are prepared by reacting thiophosphoryl chloride with the phenol reactant, as previously defined, in the presence of a hydrogen chloride acceptor to form an intermediate O-($\alpha,\alpha,\alpha$-trifluoro-m-tolyl) phosphorodichloridothioate. Good results are obtained when employing equimolecular proportions of the reactants and hydrogen chloride acceptor. The reaction is preferably conducted in the presence of an inert liquid reaction medium, which can be any of the representative organic liquids set forth above in the preferred method for the preparation of the products of the present invention. The reaction takes place at temperatures of from −50° to 80° C., with the production of the desired intermediate and hydrogen chloride of reaction, which typically appears as the hydrogen chloride salt of the acceptor. The intermediate is thereafter successively reacted with an amino compound of the formula:

$$HN—(R')_2$$

and with a loweralkanol reactant of the formula:

$$HOR$$

Both reactions are preferably carried out in the presence of a hydrogen chloride acceptor, and in an inert liquid reaction medium, most conveniently, one of the organic liquids set forth above. Good results are obtained when operating at temperatures of from −10° to 60° C., and employing substantially one molecular proportion of each of the intermediate, the amino compound, and the loweralkanol, and a total of substantially two molecular proportions of hydrogen chloride acceptor. Upon completion of the reactions, the desired product is separated and, if desired, purified by conventional procedures.

The following examples set forth the best method now known for practicing the present invention and will enable those skilled in the art to practice the present invention.

*Example 1.—O-($\alpha,\alpha,\alpha$-trifluoro-m-tolyl) O-methyl methyl phosphoramidothioate*

O-methyl methyl phosphoramidochloridothioate (16 grams; 0.1 mole) and $\alpha,\alpha,\alpha$-trifluoro-m-cresol (16.3 grams; 0.1 mole) were mixed with 150 milliliters of chloroform (inhibited by amylene). To the resulting mixture, triethylamine (10.1 grams; 0.1 mole) was added portionwise over a period of time. The resulting mixture was heated to reflux temperature of about 73° C. and maintained under reflux for approximately 4 hours. Thereafter, the reaction mixture was cooled to room temperature and washed with deionized water.

The washed mixture was distilled under subatmospheric pressure of 60°/5 millimeters. The resulting O-($\alpha,\alpha,\alpha$-trifluoro-m-tolyl) O-methyl methyl phosphoramidothioate product, a yellow oil, had a refractive index $n_D^{25}=1.4952$.

Other representative products of the present invention include the following:

O-($\alpha,\alpha,\alpha$-trifluoro-m-tolyl) O-ethyl diethyl phosphoramidothioate (M.W. of 341.3), prepared by reacting together $\alpha,\alpha,\alpha$-trifluoro-m-cresol and O-ethyl diethyl phosphoramidochloridothioate.

O-(α,α,α-trifluoro-m-tolyl) O-methyl tert-butyl phosphoramidothioate (M.W. 327.3), prepared by reacting together α,α,α-trifluoro-m-cresol and O-methyl tert-butyl phosphoramidochloridothioate.

O-(α,α,α-trifluoro-m-tolyl) O-n-propyl N-ethyl N-sec-butyl phosphoramidothioate (M.W. of 383.4), prepared by reacting together α,α,α-trifluoro-m-cresol and O-n-propyl N-ethyl N-sec-butyl phosphoramidochloridothioate.

O-(α,α,α-trifluoro-m-tolyl) O-methyl isopropyl phosphoramidothioate, a liquid, prepared by reacting together α,α,α-trifluoro-m-cresol and O-methyl isopropyl phosphoramidochloridothioate.

O-(α,α,α-trifluoro-m-tolyl) O-n-butyl dimethyl phosphoramidothioate (M.W of 341.3), prepared by reacting together α,α,α-trifluoro-m-cresol and O-n-butyl dimethyl phosphoramidochloridothioate.

O-(α,α,α-trifluoro-m-tolyl) O-sec-butyl phosphoramidothioate (M.W. of 313.3), prepared by reacting together α,α,α-trifluoro-m-cresol and O-sec-butyl phosphoramidochloridothioate.

The products of the present invention are useful as insecticides and acaricides for the control of numerous pest species of these categories. For such use, one or more of the products of the present invention can be dispersed on an inert finely divided solid and employed as a dust. In addition, one or more of the products can be mixed with a surface-active dispersing agent and employed, either in that form or diluted with either water or an organic liquid, for the useful purposes of the present invention. When the resulting composition is a liquid, it is frequently employed as a spray. The products of the present invention can also be employed as constituents of organic liquid compositions, oil-in-water or water-in-oil emulsions, or water dispersions, with or without the addition of any surface-active dispersing agent.

In particular, the products of the present invention have been found to be of outstanding usefulness for the control of stableflies (*Stomoxys calcitrans*). This species is a blood sucker which attacks animals of a wide variety, and is a major economic problem in the raising of horses, cattle, sheep, and other domestic animals. Control of stableflies has largely been confined to elimination of breeding places, typically straw, hay, manure and similar accumulations of vegetation, particularly decaying vegetation; mechanical control with traps; and the use of spray compositions containing an agent toxic to stableflies upon contact therewith.

The products of the invention given excellent control of stableflies when fed to the animals which they ordinarily would attack. In representative operations, each of O-(α,α,α-trifluoro-m-tolyl) O-methyl methyl phosphoramidothioate and O-(α,α,α-trifluoro-m-tolyl) O-methyl isopropyl phosphoramidothioate was separately employed for the control of stableflies. In these operations, each of the compounds was administered to a group of animals, at the rate of 100 milligrams of compound per kilogram of individual animal body weight. Thereafter, a known number of stableflies was permitted to feed upon each of the groups of animals. The groups were examined 24 hours following administration to determine percent kill of the stableflies, and in the instance of each of the two compounds, 100 percent kill was obtained.

We claim:
1. Compound of the formula:

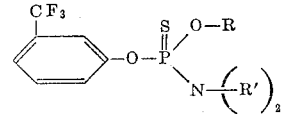

wherein R represents loweralkyl and each R' independently represents hydrogen or loweralkyl.

2. Compound of claim 1 wherein one R' represents hydrogen and each of R and the other R' represents methyl.

3. Compound of claim 1 wherein R represents methyl, one R' represents hydrogen, and the other R' represents isopropyl.

No references cited.

CHARLES B. PARKER, *Primary Examiner.*

A. H. SUTTO, *Assistant Examiner.*